United States Patent
Blakeslee et al.

[11] Patent Number: 5,153,508
[45] Date of Patent: Oct. 6, 1992

[54] METHOD AND APPARATUS FOR DETERMINING RETURN STROKE POLARITY OF DISTANT LIGHTNING

[75] Inventors: Richard J. Blakeslee, Huntsville, Ala.; Marx Brook, Socorro, N. Mex.

[73] Assignee: United States of America as Represented by the Administrator, National Aeronautics and Space Administration, Washington, D.C.

[21] Appl. No.: 776,710

[22] Filed: Oct. 15, 1991

Related U.S. Application Data

[63] Continuation of Ser. No. 7,571,687, Aug. 23, 1990, abandoned.

[51] Int. Cl.⁵ .................... G01W 1/00; G01R 31/02
[52] U.S. Cl. ....................................... 324/72; 340/601
[58] Field of Search ............. 324/72, 72.5; 73/170 R; 340/601

[56] References Cited

U.S. PATENT DOCUMENTS

| | | | |
|---|---|---|---|
| 3,753,117 | 8/1973 | Downing et al. | 324/72 |
| 4,023,408 | 5/1977 | Ryan et al. | 324/72 |
| 4,095,221 | 6/1978 | Slocum, Jr. | 324/72 |
| 4,198,599 | 4/1980 | Krider et al. | 324/72 |
| 4,272,720 | 6/1981 | Lennon | 324/72 |
| 4,422,037 | 12/1983 | Coleman | 324/72 |
| 4,672,305 | 6/1987 | Coleman | 324/72 |
| 4,684,951 | 8/1987 | Bauner | 324/72 |
| 4,803,421 | 2/1989 | Ostrander | 324/72 |
| 4,823,115 | 4/1989 | McCallie | 73/170 R |
| 4,901,564 | 2/1989 | Williams et al. | 324/72 |
| 4,996,473 | 2/1991 | Markson et al. | 340/601 |

Primary Examiner—Jack B. Harvey
Assistant Examiner—Maura Regan
Attorney, Agent, or Firm—Robert L. Broad, Jr; Guy M. Miller; John R. Manning

[57] ABSTRACT

A method is described for determining the return stroke polarity of distant lightning for distances beyond 600 km by detecting the electric field associated with a return stroke of distant lightning, and processing the electric field signal to determine the polarity of the slow tail of the VLF waveform signal associated with the detected electric field. The polarity of the return stroke of distant lightning is determined based upon the polarity of the slow tail portion of the waveform.

8 Claims, 2 Drawing Sheets

METHOD AND APPARATUS FOR DETERMINING RETURN STROKE POLARITY OF DISTANT LIGHTNING

ORIGIN OF THE INVENTION

The invention described herein was made, in part, by an employee of the United States Government and may be manufactured and used by or for the Government for governmental purposes without the payment of any royalties thereon or therefor.

This application is a continuation of application Ser. No. 07/571,687 filed Aug. 23, 1990 now abandoned.

FIELD OF THE INVENTION

The present invention relates to a method and apparatus for determining return stroke polarity of distant lightning and, more particularly, to a method for determining return stroke polarity of lightning greater than 600 km away by determining the polarity of the first hump in the slow tail portion of the VLF waveform associated with the electric field produced by the lightning.

BACKGROUND OF THE INVENTION

Data on lightning and thunderstorm electrical activity, such as occurrence frequency, spatial distribution and temporal properties, have become available in significant quantity and detail in recent years. Reference is made, for example, to Mach, et al. "Site Errors and Detection Efficiency in a Magnetic Direction-finder Network for Locating Lightning Strikes to Ground," *J. Atmos. Oceanic Technol.* 3, 67–74 (1986); and Orville, et al. "Cloud-to-Ground Lightning Flash Characteristics from June 1984 through May 1985," *J. Geophys. Res.* 92, 5640–45644 (1987). More recently, it has been recognized that polarity patterns of lightning occurrence in mesoscale systems appear to be related to the direction of the upper level winds. Reference is made to Orville, et al. "Bipole Patterns Revealed by Lightning Locations in Mesoscale Storm Systems," *Geophys. Res. Lett.*, (Feb., 1988).

In view of this recent accumulation of data, there is a growing awareness that return stroke polarity may be an important indicator of certain phenomena associated with thunderstorms. For example, there is evidence that the polarity of lightning strokes, i.e., the return stroke polarity of lightning, may be an indicator of the progress of a thunderstorm and, hence, an understanding of conditions which lead to the dominance of one polarity or the other is of importance. One result of recent studies involving return stroke polarities is the finding that positive ground stroke currents constitute approximately 1 percent of the total return strokes in summer storms, but dominate in winter storms, with current rates being as high as 95 percent.

Previous studies to determine polarity of return strokes of lightning have been limited to 600 km or less because of the attenuation of the lightning ground wave over distance. Errors in determining polarity of distant lightning (occurring at greater than 600 km away) can occur because the ionospheric reflection of the lightning stroke, unlike the ground wave, is not attenuated much but is usually reversed in polarity.

Studies of distant lightning (occurring at greater than 600 km away) is generally performed by measurement of the associated electric fields in the form of radiated waveforms. Return strokes of both negative and positive polarity exist in such distant radiated waveforms, and an effort has been made to provide closer examination of the waveforms of the radiation fields. One observation that has been made based on this examination is that many lightning VLF waveforms from a distance beyond 500-600 km exhibit well-defined, positive or negative slow tails, with a slow tail being defined as a low frequency dispersion effect occurring in the zeroth mode of the earth-ionosphere wave guide.

While the observation of the slow tails in a lightning electric field dates back to 1926, numerous questions regarding some of their properties have remained to be explained, including the important question of determining the specific source of this radiation.

SUMMARY OF THE INVENTION

Broadly speaking, the present invention is based on the discovery that the polarity of the slow tail portions of VLF waveforms based on lightning return strokes can be used in determining the polarity of the lightning strokes from very distant storms. This is significant for distant lightning (over 600 km) because, as mentioned above, the severe attenuation of the lightning ground wave over long paths has heretofore limited the examination of waveforms produced from lightning return strokes to those occurring at 600 km or less. At greater distances, any polarity information contained in the return stroke is generally found to have been lost in the initial portion of the VLF signal and, as a consequence, a polarity determination of the return stroke has been difficult to obtain. Even when such determinations are made, they have been found to be unreliable for distant lightning particularly when sought to be obtained from the initial portion of the VLF signal. However, applicants have discovered that a determination of the polarity of the slow tail portion of the VLF waveform, and specifically of the first hump in the slow tail, provides information as to whether the electric field has a negative or a positive return stroke polarity. With the advent of lightning location networks, i.e., multiple recording stations separated over a distance where data from the lightning flashes can be correlated over the telephone, it has become feasible to identify such polarity information relating to the slow tails of lightning waveforms and thus to enable, in accordance with the invention, a determination of the return stroke polarity of distant lightning.

It is therefore an object of the present invention to provide a reliable method and related apparatus for determining lightning stroke polarity of distant lightning based upon a measurement of the polarity of the first hump of a slow tail of the VLF lightning waveform.

With this and other objects in view, there is provided a method for determining a return stroke polarity of distant lightning comprising the steps of receiving an electric field associated with a return stroke of distant lightning and producing based thereon a corresponding VLF waveform including a slow tail, and determining the polarity of the slow tail to thereby determine the polarity of the return stroke of distant lightning based upon the polarity of the slow tail.

In a preferred embodiment, the method involves receiving the electric field by means of a flat-plate antenna connected to a wideband charge amplifier, line driver, and low pass filter, and outputting the processed signal to a transient digitizer recorder having a 2 MHz sampling rate with a 12 bit resolution. Further, the recorder is triggered on by means of a positive or negative lead signal produced from the detected electric field. As an alternative method to the triggering step, a magnetic direction finder unit, such as a LLP direction finder, can be used to produce a trigger on signal to the recorder. The polarity of the return stroke of distant lightning is determined based upon a characteristic of the slow tail and, specifically, based upon the polarity of the initial portion, i.e., the first hump, of the slow tail of the VLF lightning waveform.

In accordance with the foregoing, there is provided apparatus comprising a flat plate antenna, e.g., for detecting the electric field, a broadband charge amplifier with a long time constant for converting the induced charge on the antenna to a voltage signal, a filtering means for removing undesired signals such as radio frequency interference, and triggering means associated with a transient digitizer recorder for producing an output, such as a waveform, of the electric field, including the slow tail portion of the VLF waveform associated with the electric field.

Other objects, features and advantages of the invention will be set forth in, or apparent from, the detailed description of preferred embodiments of the invention which follow.

DETAILED DESCRIPTION OF THE PREFERRED EMBODIMENTS

Figure 1A:
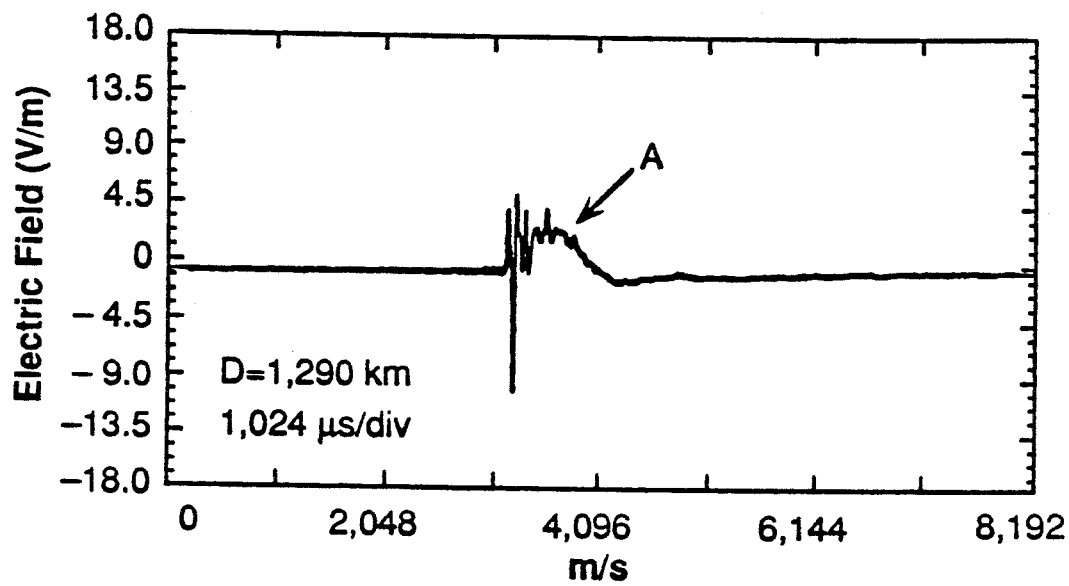
FIG. 1(a) is a graph showing a lightning return stroke VLF waveform exhibiting a positive slow tail.
Figure 1B:
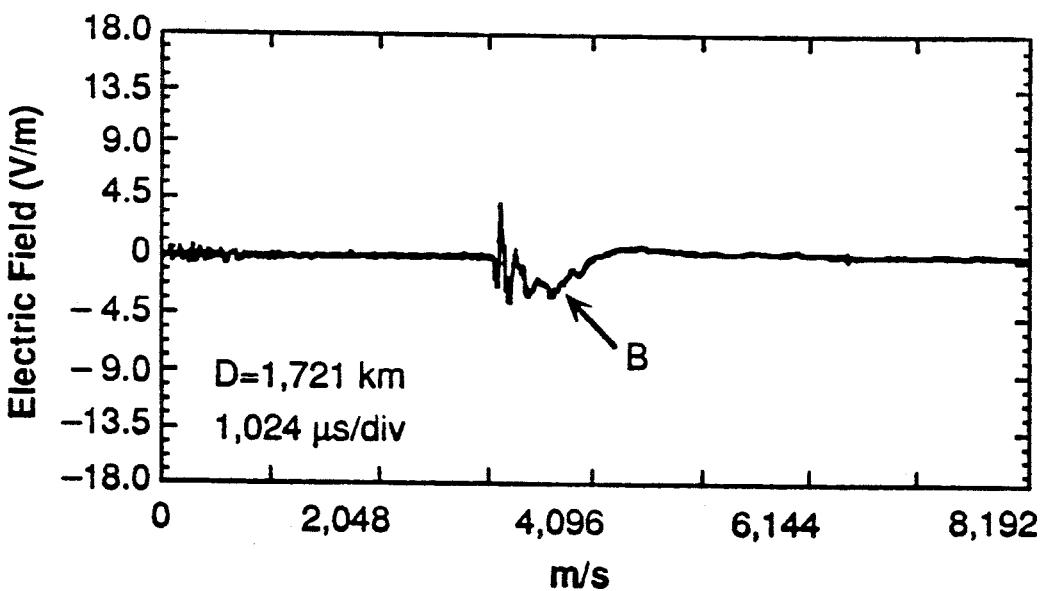
FIG. 1(b) is a graph showing a lightning return stroke VLF waveform exhibiting a negative slow tail.

FIGS. 1(a) and 1(b) show typical return stroke VLF waveforms of distant lightning which show a slow tail portion associated with each waveform. FIG. 1(a) exhibits a positive slow tail, identified by the letter A, and FIG. 1(b) exhibits a negative slow tail, identified by the letter B.

Figure 2:
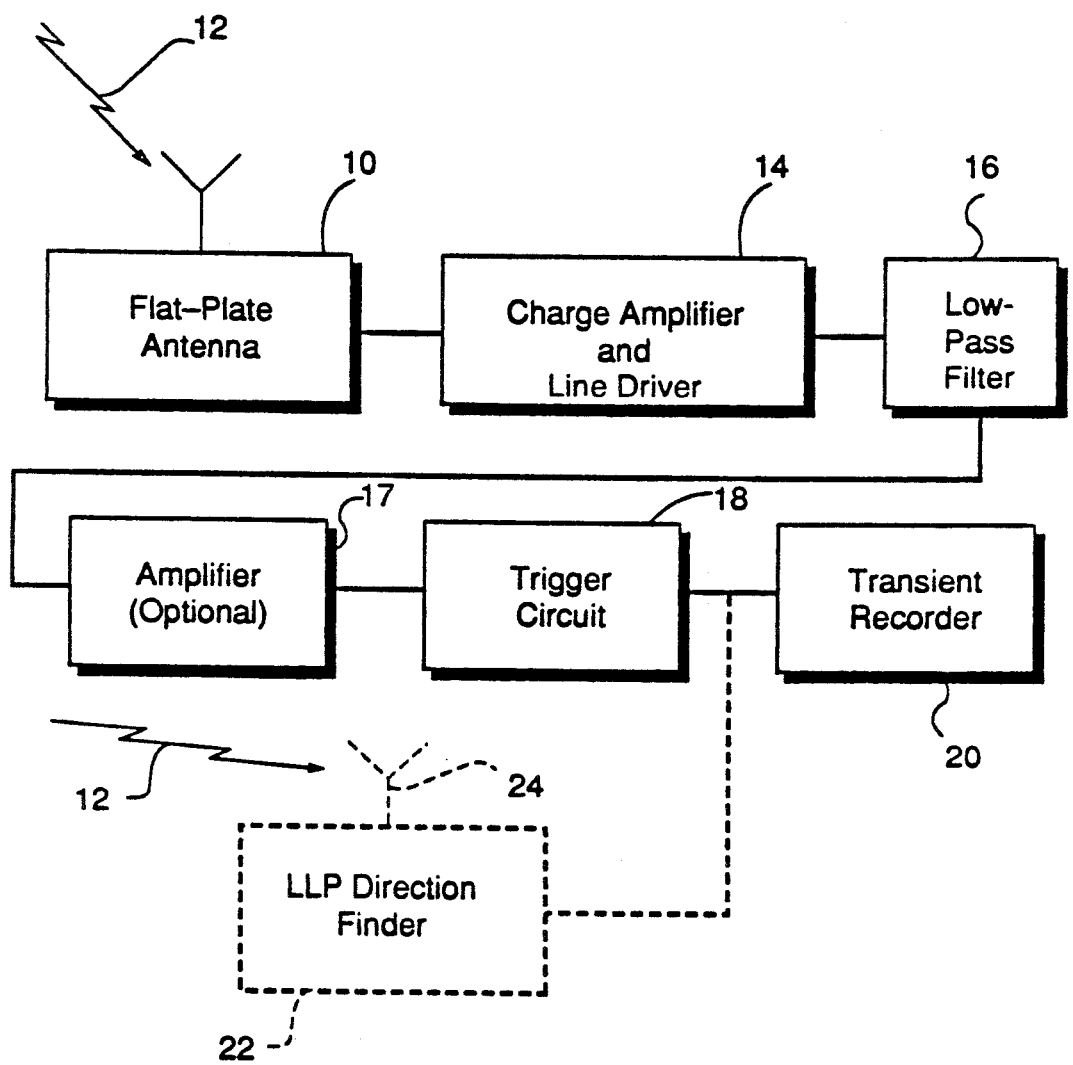
FIG. 2 is a block diagram of instrumentation used to measure the positive and negative slow tails of FIGS. 1(a) and 1(b).

FIG. 2 shows, in block diagram form, measurement apparatus of the invention, and as used in carrying out the method of the invention. A flate plate antenna 10, connected to a broadband charge amplifier and line driver 14, with a 1-10 second time constant, is used for receiving a lightning return stroke electric field, indicated at 12. Together the flate plate antenna 10 and charge amplifier/line driver 14 comprise a slow antenna system or electric field change meter (E-field meter) for receiving electric field 12. A signal from charge amplifier/line driver 14 is then passed through low pass filter 16 for rejection of undesired signals, e.g., local radio interference, while also retaining a wide band response (1 microsecond rise time) down to DC as determined by the time constant associated with the slow antenna system 10,14. An output filtered signal from filter 16 is inputted to a trigger circuit 18. Trigger circuit 18 responds to both positive and negative polarities, and has an adjustable threshold level for outputting a trigger signal, upon receipt of either a positive or negative polarity signal, to start the recording of the return stroke VLF waveform by a recorder 20.

In noisy environments, the upper frequency of low pass filter 16 can be reduced to as low a frequency as 100 khz, causing a reduced bandwidth, without affecting the slow tail signal. Therefore, in one embodiment, amplification of the signal is added by optional amplifier 17 in (FIG. 2) when using such a reduced bandwidth. If a reduced bandwidth is not used in low-pass filter 16, optional amplifier 17 is not needed, and the output of low pass filter 16 would be connected directly to trigger circuit 18, as previously discussed.

In an alternative embodiment of this apparatus, trigger circuit 18 is replaced with a magnetic direction finding unit, such as a LLP direction finder, as indicated by the dashed lines of FIG. 2, set up near the measurement apparatus. LLP direction finder 22 receives electronic field 12 concurrent with its recept by slow antenna system 10, 14. The output from LLP direction finder 22 supplies the trigger voltage to recorder 20, and trigger circuit 18 is deleted from the measurement apparatus. The output of low pass filter 16 (or of optional amplifier 17) if fed directly to transient recorder 20. The LLP electronics normally used in return stroke waveform observation have a low frequency cut-off of 1 khz which eliminates the slow tail part of the signal. This cut-off is avoided with use of the slow antenna having a virtual DC response.

Considering the operation of the apparatus of FIG. 2, the electric field 12 associated with a return stroke of distant lightning is detected by means of slow antenna system 10 and 14. As noted above, the slow antenna system 10 and 14 provides a near DC frequency response which makes possible the observation of slow tails on the VLF waveform associated with the received or detected electric field 12. An output signal indicative of detected electric field 12 is then converted by broadband charge amplifier and driver 14 to a voltage signal, the voltage signal then being filtered by low pass filter 16 to remove undesired signals, such as radio frequency interference. As discussed above, the slow antenna filtered signal is then inputted to trigger circuit 18 which turns on recorder 20 in response to receipt of the processed signal from slow antenna system 10 and 14. Alternatively, where a reduced bandwidth is used in low-pass filter 16, an optional amplifier 17 is used prior to trigger circuit 18. In the preferred embodiment, recorder 20 is a transient digitizer recorder with a 2 MHz sampling rate and a 12 bit resolution, and outputs a waveform comprising a slow tail portion thereof, from which the polarity of the first hump, i.e., the initial polarity, of the slow tail can be determined. As discussed above, this slow tail polarity is indicative of the return stroke polarity of the distant lightning.

Also as discussed hereinabove, trigger circuit 18 can be replaced by a LLP direction finder 22 which serves to provide the triggering to turn on transient digitizer recorder 20, in which case trigger circuit 18 is removed from the apparatus of FIG. 2. In operation, direction finder unit 22 produces an output triggering signal based upon detection of electric field 12 by an antenna 24 associated with direction finder unit 22. This contrasts with trigger circuit 18 which produces an output triggering signal based upon receipt of the processed signal associated with electric field 12 as initially received by flat-plate antenna 10.

It will be understood by those skilled in the art that although the invention has been described in relation to exemplary preferred embodiments thereof, variations and modifications can be effected in these preferred embodiments without detracting from the scope and spirit of the invention.

We claim:

1. A method to determine the return stroke polarity of distant lightning, said method comprising the steps of:

receiving an electric field of a return stroke of lightning at a distance of greater than about 600 km and producing an associated signal comprising a VLF waveform in accordance therewith including a slow tail thereof; and determining the polarity of a first hump of said slow tail so as to determine the polarity of the return stroke of the lightning.

2. A method according to claim 1, wherein a flat plate antenna is used to receive the electric field.

3. A method according to claim 1, wherein said VLF waveform is processed prior to said determining step and said processing comprises the steps of amplifying the electric field signal using broadband charge amplifier means and removing undesired signals using filtering means.

4. A method according to claim 2, wherein the step of determining said polarity includes the step of outputting the VLF waveform including the slow tail to a transient digitizer recorder.

5. A method according to claim 4, wherein said outputting step comprises using said transient digitizer recorder to sample said waveform at a 2 MHz rate and with a 12 bit resolution.

6. A method according to claim 4, wherein the step of determining said polarity comprises the step of triggering on the transient digitizer recorder using a positive or negative signal comprised within said associated signal.

7. A method according to claim 4, wherein the step of determining the polarity comprises the step of triggering on the transient digitizer recorder using a trigger signal from a magnetic direction finder.

8. A method according to claim 7, wherein the step of triggering the recorder on using said magnetic direction finder comprises using a LLP direction finder.

* * * * *